United States Patent [19]

Sawyer

[11] 4,150,524
[45] Apr. 24, 1979

[54] CROP CONDITIONER ROLL

[75] Inventor: Bobby G. Sawyer, Ottumwa, Iowa

[73] Assignee: Deere & Company, Moline, Ill.

[21] Appl. No.: 796,057

[22] Filed: May 12, 1977

[51] Int. Cl.$^2$ ............................................. A01D 49/00
[52] U.S. Cl. ..................................... 56/1; 56/DIG. 1
[58] Field of Search ................. 56/DIG. 1, 1; 130/5 J

[56] References Cited

U.S. PATENT DOCUMENTS

| 2,753,788 | 7/1956 | Getz | 56/DIG. 1 |
| 3,732,670 | 5/1973 | Milliken et al. | 56/DIG. 1 |

FOREIGN PATENT DOCUMENTS 672356  10/1963  Canada ................................ 56/DIG. 1

*Primary Examiner*—Jay N. Eshovitz

[57] ABSTRACT

An agricultural harvesting machine, such as a mower-conditioner or the like, includes a pair of meshing crop conditioner rolls between which harvested crop material is passed to accelerate the drying of the crop in the field. The rolls are of identical construction, each roll being made of a tubular metal core with a molded body of elastomeric material molded onto the core. Each roll has a plurality of generally radially extending lugs that are disclosed in axially extending rows, with the lugs on one roll meshing with and extending into the space between the lugs on the opposite roll, each lug having an arcuate outer surface coaxial with the roll axis so that the outer surfaces of the lugs conjunctively form an interrupted and generally cylindrical outer roll periphery. The outer surface of each lug is in the shape of a parallelogram having two opposite sides parallel to the roll axis and the other opposite sides canted relative to the roll axis. A recess is provided in the outer surfaces of each lug, the recess having a depth less than the height of the lug so that the bottom of the recess is outwardly of the space between the lugs, each recess being elongated and having opposite sides parallel and adjacent to the canted opposite sides of the lug.

10 Claims, 3 Drawing Figures

CROP CONDITIONER ROLL

BACKGROUND OF THE INVENTION

This invention relates to an improved crop conditioner roll such as is used in a mower-conditioner or the like.

As is well known, a mower-conditioner, such as shown in U.S. Pat. No. 3,797,207, also assigned to the assignee herein, includes a pair of crop conditioner rolls between which crop material passes after it is severed from the field, the crop material being deposited on the ground in a windrow after it leaves the conditioning rolls. The conditioning rolls act to crush and/or crimp the stems of the crop material as it passes between the rolls, and, as is well known, the crushing or crimping of the stems accelerates the drying or curing of the stems, reducing the amount of time that the crop must lay in the field before it can be safely stored in bales, haystacks, or the like.

The mower-conditioner of more recent vintage, the conditioner rolls have been made of molded elastomeric material, typically rubber, and have included lugs or ribs that mesh with spaces between the lugs or ribs on the opposite roll. U.S. Pats. 3,732,670 and 3,513,645 illustrate molded rubber rolls typical of those on machines currently being marketed.

Such molded rolls conventionally include a tubular steel core with a rubber body molded onto the core. The process currently being utilized to manufacture said rolls has required relatively high pressures that has necessitated the use of a relatively thick walled tubular core, which has both increased the cost of the roll and increased the weight of the machine wherein the roll is utilized. Also it has been found that the molding process frequently deforms the tubular core, and keeping such rolls within acceptable limits in regard to straightness has been a problem.

To overcome such problems, it has been proposed that the rolls be made of cast polyurethane, wherein the molding process does not require the high pressures. This has permitted the use of thinner walled tubing for the core and also a thinner layer of material on the core, since there is no longer deformation of the core during the molding process. However, the polyurethane is substantially more expensive than rubber, and the material costs still present a problem for such rolls.

SUMMARY OF THE INVENTION

According to the present invention, an improved roll configuration is provided to reduce the cost of a conditioner roll and improve the crop conditioning function of the roll. More specifically, a recess is provided in the outer surface of each lug or rib on the roll, the edges of the recesses on the roll periphery increasing the number of edges in contact with the crop to increase the edges that crimp the crop's stems.

Also, since the outer periphery of the roll or the outer surface of each roll lug or rib normally bears against crop material trapped between the outer periphery of the one roll and the space between the lugs on the opposite roll, the recess in the outer surface reduces the area of said surface to thereby increase the unit pressure at the contact surface for a given force biasing the rolls toward one another. Thus, higher unit pressures are provided for a given biasing force and bearing load on the rolls.

Another feature of the invention resides in the fact that the recesses reduce the amount of elastomeric material necessary in the lugs, thereby reducing the cost of the roll.

Still another feature of the recesses in the lugs is an increase in the aggressiveness of the roll to improve the rolls feeding characteristics.

DESCRIPTION OF THE PREFERRED EMBODIMENT

Figure 1:
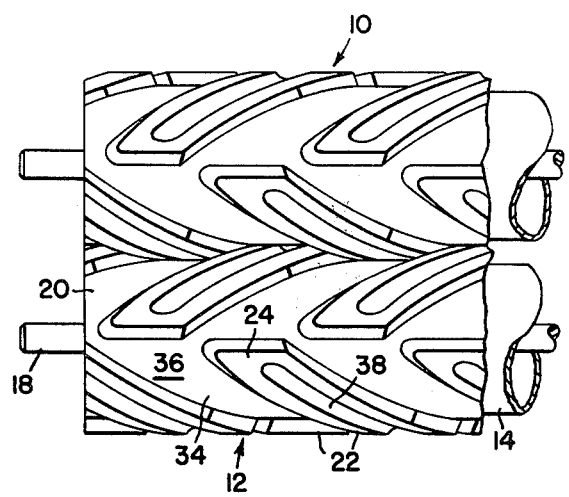
FIG. 1 is a fragmentary elevation view of one end of a pair of the improved conditioner rolls in their normal intermeshing arrangement.
Figure 2:
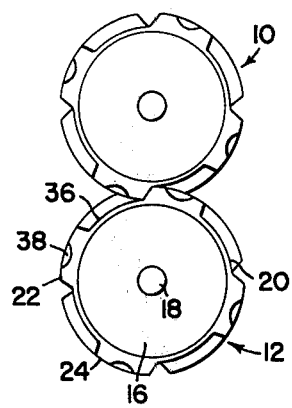
FIG. 2 is an end view of the conditioner rolls shown in FIG. 1.

A pair of the improved conditioner rolls are illustrated in FIGS. 1 and 2, wherein upper and lower conditioner rolls 10 and 12 are illustrated in an intermeshing relationship as they would be in use on an actual mower-conditioner. Since the upper and lower conditioner rolls 10 and 12 are identical, only the lower roll 12 will be described in detail.

The conditioner roll 12 includes a tubular core 14 that is preferably made of steel tubing and has a pair of circular end plates or disk 16 at its opposite ends, an axial shaft stub 18 being welded to and extending outwardly from the opposite end plates 16. A tubular body 20 of elastomeric material is molded around the tubular core 14 and has a plurality of outwardly extending lugs 22 arranged in a regular repeating pattern, the lugs extending around the entire circumference of the roll and throughout the entire length of the roll. Only one end of the roll is shown in the drawings, since, as is well known, the rolls are relatively long, extending from 7 to 12 feet in length in the typical mower-conditioner. Each lug has an arcuate outer surface 24 that has a center of curvature on the roll axis. The outer surface of each lug is generally the shape of parallelogram, each lug having opposite, parallel, generally radially extending sides 26 and 28 that are relatively short and extend in the direction of the roll axis. Each lug also has opposite, parallel elongated sides 30 and 32 that are canted relative to the roll axis. As is apparent from FIG. 3, the lugs are arranged in four axially extending rows, with the lugs in one row being canted in the same direction and the lugs in the adjacent rows being canted in opposite directions, so that the lugs form somewhat of a herringbone effect. The lugs in each row are spaced equidistantly apart and the space between the lugs, which is identified by the numeral 34, is also generally in the shape of a parallelogram slightly larger than the parallelogramed shaped lugs. As is also apparent from FIG. 3, the lugs in one row are offset relative to the lugs in the next row so that the sides 26 and 28 of the lugs in one row bound the space 34 between the lugs in the next row. The outer surfaces 24 of the lugs 22 lie in a cylinder, or in other words, conjunctively form an interrupted cylinder. Similarly, the space between the lugs on the body 20 has a cylindrical surface 36 that is smaller than the cylinder formed by the outer surfaces of the lugs.

Figure 3:
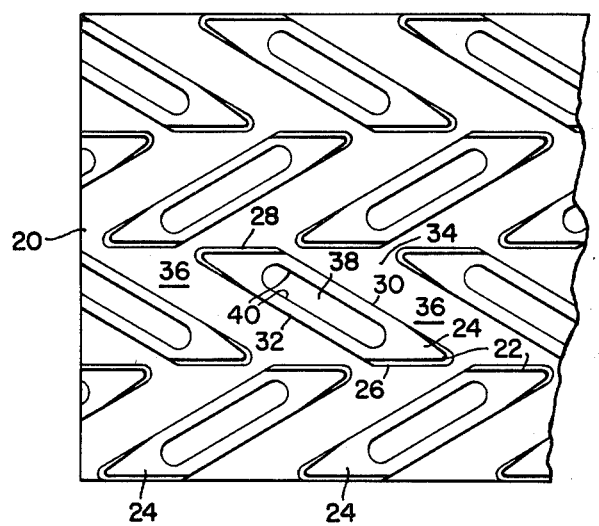
FIG. 3 is a fragmentary flat pattern of the outer surface of one of the conditioner rolls.

A recess 38 is provided in the outer surface 24 of each lug 22, and, as shown in FIG. 3, each recess 38 is elongated in the direction of elongation of the lug and has parallel longitudinal edges 40 that are respectively parallel and adjacent to the lug sides 30 and 32. The recesses are relatively narrow in width and have rounded ends and have arcuate bottoms that are disposed outwardly of the cylindrical surface 36 in the space between the lugs, the depth of the recess being approximately one-half the depth of the lug.

The roll is preferably made of polyurethane and is cast by a process known as the reaction injection molding process, wherein the core 14 is placed in a mold and the reacting materials that form the polyurethane are mixed as they are injected into the mold. This eliminates the high pressures utilized in the older molding processes, permitting the use of a lighter and thinner core 14, which is not subjected to any stresses that might deform the core during the casting process.

In operation, the rolls are mounted on the harvesting machine with the lugs 22 on one roll extending into the space 34 between the lugs on the opposite roll, one of the rolls conventionally being movable toward and away from the other to permit the passage of crop material in mats of varying thickness. A biasing force is conventionally applied to the moveable roll to bias it against the opposite roll so that the outer surface 24 of the lugs 22 on one roll are urged toward the surface 36 on the body 20 of the opposite roll. As the machine advances, crop material is severed from the field and is fed to the bite between the rolls, which engage the crop material and pass it rearwardly between the rolls. As the crop material passes between the rolls, it is crushed between the surfaces 24 and 26, and the reduced outer surface area 24 as the result of the recesses 38, results in a higher unit pressure for a given biasing force. Also, the crop material is crimped as it passes between the meshing rolls, the crimping points being at the outer edges of the sides of the various lugs. The edges 40 of the recess 38 also form additional crimping edges that increase the number of crimps put in the crop material, so that the recesses improve both the crimping and the crushing operation on the rolls, while reducing the amount of material and consequently the cost of the roll. The edges 40 also provide a more aggressive roll periphery, to improve the feeding characteristics of the rolls.

I claim:

1. A crop conditioner roll for use in parallel intermeshing relationship with another similar roll and having an elongated generally cylindrical body and a plurality of spaced lugs of elastomeric material extending radially outwardly from the body and having arcuate outer surfaces generally coaxial with the core so that the outer surfaces conjunctively form an interrupted generally cylindrical outer periphery opposite the body of the other roll, characterized in that a recess is provided in the outer surface of at least some of the lugs to provide additional edges on the outer periphery of the roll, each recess having a non-intermeshing relationship with the opposite roll.

2. The conditioner roll according to claim 1 further characterized in that the depth of the recess in each lug is less than the height of the lug so that the bottom of the recess is outwardly of the surface of the body between the lugs.

3. The conditioner roll according to claim 2 wherein the outer surface of each lug has a generally polygonal configuration and the roll is further characterized in that each recess has at least two edges parallel to and spaced from two of the sides of the lug.

4. The conditioner roll according to claim 3 wherein the outer surface of each lug is generally in the shape of a parallelogram having two opposite sides parallel to the axis of the roll and two opposite sides canted relative to the axis of the roll, the lugs being arranged in rows so that the space between the lugs is in the shape of a parallelogram that receives the lugs from the other roll, and the roll is further characterized in that said two edges of each recess are parallel to the sides of the lug that are canted relative to the axis of the roll.

5. The conditioner roll according to claim 1 further characterized in that a recess is provided in the outer surface of each lug.

6. The conditioner roll according to claim 5 further characterized in that the depth of the recess in each lug is less than the height of the lug so that the bottom of the recess is outwardly of the surface with the body between the lugs.

7. The conditioner roll according to claim 6 wherein the outer surface of each lug has a generally polygonal configuration and the roll is further characterized in that each recess has at least two edges parallel to and spaced from two of the sides of the lug.

8. The conditioner roll according to claim 7 wherein the outer surface of each lug is generally in the shape of a parallelogram having two opposite sides parallel to the axis of the roll and two opposite sides canted relative to the axis of the roll, the lugs being arranged in rows so that the space between the lugs is in the shape of a parallelogram that receives the lugs from the other roll, and the roll is further characterized in that said two edges of each recess are parallel to the sides of the lug that are canted relative to the axis of the roll.

9. The conditioner roll according to claim 1 wherein the outer surface of each lug has a generally polygonal configuration and the roll is further characterized in that each recess has at least two edges parallel to and spaced from two of the sides of the lug.

10. The conditioner roll according to claim 9 wherein the outer surface of each lug is generally in the shape of a parallelogram having two opposite sides parallel to the axis of the roll and two opposite sides canted relative to the axis of the roll, the lugs being arranged in rows so that the space between the lugs is in the shape of a parallelogram that receives the lugs from the other roll, and the roll is further characterized in that said two edges of each recess are parallel to the sides of the lug that are canted relative to the axis of the roll.

* * * * *